United States Patent
Pfeiffer

(12) 
(10) Patent No.: US 6,215,573 B1
(45) Date of Patent: Apr. 10, 2001

(54) RECEIVER FOR AN OPTICAL COMMUNICATIONS SYSTEM, FILTER DEVICE, AND METHOD FOR OPERATING SUCH A SYSTEM

(75) Inventor: Thomas Pfeiffer, Stuttgart (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/085,859

(22) Filed: May 28, 1998

(30) Foreign Application Priority Data

May 28, 1997 (DE) .............................. 197 22 560

(51) Int. Cl.[7] .......................... H04B 10/00; H04B 10/36
(52) U.S. Cl. ............................. 359/193; 359/136
(58) Field of Search ................... 359/193, 136, 359/577–590

(56) References Cited

U.S. PATENT DOCUMENTS

| | | | |
|---|---|---|---|
| 4,561,119 | * 12/1985 | Epworth | 455/609 |
| 5,293,548 | * 3/1994 | Siebert | 359/380 |
| 5,371,354 | 12/1994 | Domon et al. | |
| 5,389,778 | 2/1995 | Shinomiya | |
| 5,654,814 | * 8/1997 | Ouchi | 359/156 |
| 5,742,418 | * 4/1998 | Mizutani | 359/156 |
| 5,784,506 | * 7/1998 | Pfeiffer | 385/24 |
| 6,088,144 | * 7/2000 | Doerr | 359/193 |

FOREIGN PATENT DOCUMENTS

| | | |
|---|---|---|
| 4206555 | 9/1992 | (DE) . |
| 0622913 | 11/1994 | (EP) . |
| 0670641 | 9/1995 | (EP) . |

OTHER PUBLICATIONS

"An Optical CDMA Method Based on Periodic Spectrum Encoding" by L. Moller, Conference on European Fibre Optic Communications and Networks, England, 1995 pgs 178–181.

* cited by examiner

*Primary Examiner*—Leslie Pascal
*Assistant Examiner*—Agustin Bello
(74) *Attorney, Agent, or Firm*—Ware, Fressola, Van Der Sluys & Adolphson LLP

(57) ABSTRACT

A receiver (R) is disclosed for receiving coded optical signals in an asynchronous optical transmission system using a CDMA method based on periodic spectrum encoding. The receiver (R) has a filter device (Rx) for decoding received signals as well as an optical detector unit (PD). The filter device (Rx) consists of a periodic filter (PRx) and a prefilter (VOR) whose transfer function causes the cosine transform of the optical frequency spectrum of the signal to be limited to a predeterminable range of a tuning curve. This reduces crosstalk between adjacent channels in the tuning range, and increases the maximum permissible number of transmitters.

7 Claims, 4 Drawing Sheets

RECEIVER FOR AN OPTICAL COMMUNICATIONS SYSTEM, FILTER DEVICE, AND METHOD FOR OPERATING SUCH A SYSTEM

TECHNICAL FIELD

This invention relates to an optical receiver for an optical communications system for transmitting coded optical signals, comprising an optical detector unit and an optical filter device connected ahead of the optical detector unit and comprising a periodic filter with a periodic transfer function. The invention also relates to an optical filter device for use in an optical communications system for transmitting coded optical signals, comprising a periodic filter with a periodic transfer function. The invention further relates to a method of operating this communications system comprising the steps of coding the signal in a transmitter by means of a transmitter filter and decoding it and converting it to an electric signal in a receiver by means of a periodic filter and detector unit, respectively.

BACKGROUND OF THE INVENTION

In a paper by L. Möller, "An Optical CDMA Method Based on Periodic Spectrum Encoding", presented at the Thirteenth Annual Conference on European Fibre Optic Communications and Networks, Brighton, England, 1995, pp. 178–181, an asynchronous transmission system is described which uses a CDMA (code-division multiple access) method based on periodic spectrum encoding. In that system, the code words used for gaining access are implemented by different transfer functions of periodic filters. The method uses a particular periodic spectral filtering technique for broadband optical signal sources. An information signal can be received and processed in a receiver only if the periodicities of the filter transfer functions of the transmitter and receiver match.

In the communications system described, crosstalk occurs when two or more transmitters with filter transfer functions that are contiguous to each other in the tuning range are transmitting simultaneously.

SUMMARY OF THE INVENTION

It is therefore an object of the present invention to provide an optical receiver for a communications system of the above kind wherein crosstalk between transmitters contiguous to each other in the tuning range is reduced. Further objects are to provide an optical filter device for use in such an optical communications systems as well as a method of operating this communications system.

These objects are attained by a receiver for an optical communications system for transmitting coded optical signals, comprising an optical detector unit and an optical filter device connected ahead of the optical detector unit and comprising a periodic filter with a periodic transfer function, wherein the filter device additionally comprises a prefilter with a transfer function by which the optical frequency spectrum of the signal can be changed in such a way that its cosine transform is limited to a predeterminable range of a tuning curve showing the total received power when tuning the periodic filter.

The objects are further attained by an optical filter device for use in an optical communications system for transmitting coded optical signals, comprising a periodic filter with a periodic transfer function, wherein the device includes an additional prefilter having a transfer function by which the optical frequency spectrum of the signal can be changed in such a way that its cosine transform is limited to a predeterminable range of a tuning curve showing the total received power when tuning the periodic filter.

The objects are still further attained by a method of transmitting coded optical signals in an optical communications system, comprising the steps of coding the signal in a transmitter by means of a transmitter filter and decoding it and converting it to an electric signal in a receiver by means of a periodic filter and a detector unit, respectively, wherein prior to the conversion, the signal is filtered by means of a prefilter with a transfer function which changes the optical frequency spectrum of the signal in such a way that its cosine transform is limited to a predeterminable range of a tuning curve showing the total received power when tuning the periodic filter, respectively. Further advantageous features of the invention are defined in the dependent claims.

The invention has the advantage that the number of transmitters that can transmit simultaneously and independently of each other without creating crosstalk is greater than in prior-art systems.

Another advantage is that even if the filter transfer functions of the transmitter and receiver deviate from respective nominal transfer functions, no crosstalk will occur.

BRIEF DESCRIPTION OF THE DRAWINGS

The invention will become more apparent from the following description of an embodiment when taken in conjunction with the accompanying drawings, in which.

BEST MODE FOR CARRYING OUT THE INVENTION

Figure 1:
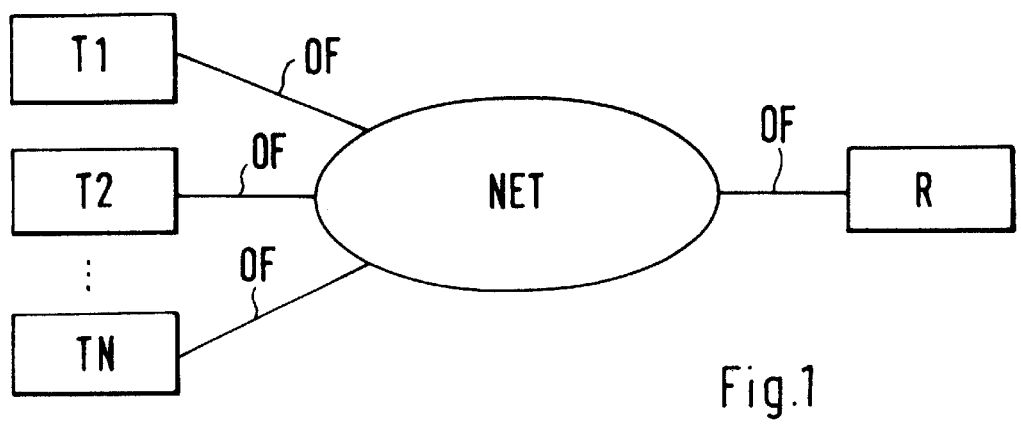
FIG. 1 shows an optical communications system with a plurality of transmitters and one receiver.

Referring to FIG. 1, there is shown an optical communications system with N optical transmitters T1, . . . , TN and one optical receiver R which are interconnected by an optical communications network NET and optical fibers OB. The communications system may also comprise further optical receivers.

In the communications system, optical signals are transmitted in coded form. The coding is performed in the transmitter by filtering light signals modulated with the message to be transmitted. This is done using a periodic filter, such as a Fabry-Perot interferometer or a Mach-Zehnder interferometer.

Decoding in the receiver is accomplished by filtering the received signals with a similar filter. To obtain a signal at the output of the receiver filter, the periodicities of the transfer functions of the transmitter filter and receiver filter must match. To accomplish this, it is advantageous if the filters of the transmitter and receiver are polarization-independent.

In this arrangement, all transmitters can transmit information signals simultaneously and asynchronously in the same frequency band, which can then all be received independently of each other by one or more receivers. The arrangement thus uses a code division multiple access (CDMA) technique, with the code for accessing a particular signal being realized by the transfer functions of the periodic filters in the transmitter and receiver. To accomplish this, the individual transmitters must use respective filter transfer functions with different periodicities so as not to interfere with the code of another transmitter. In the following, the individual information signals of different transmitters with filter transfer functions of different periodicities will be referred to as channels.

Figure 2:
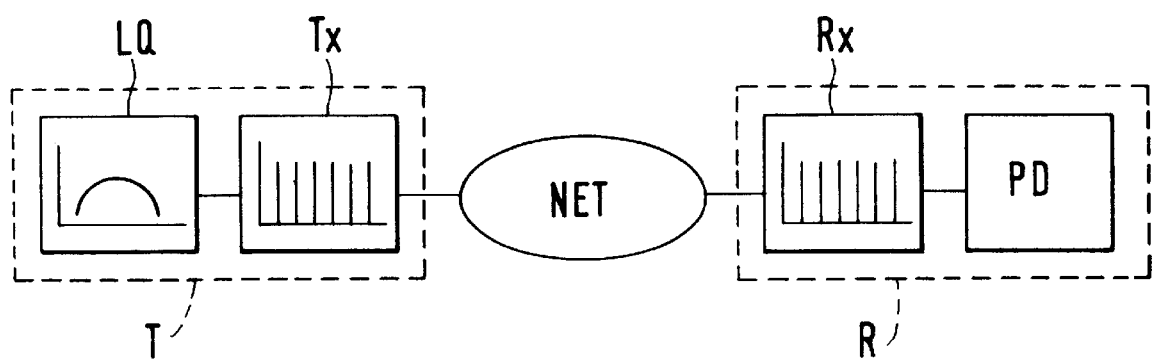
FIG. 2 shows an optical communications system with one transmitter and one receiver.

A transmitter T and a receiver R which are interconnected through the communications network NET are shown in more detail in FIG. 2. The transmitter T contains a broadband signal light source LQ, for example a light-emitting diode with a wavelength spectrum from 1520 to 1580 nm or a multimode laser, and a filter Tx. The receiver contains a filter device Rx having its output coupled to an optical detector unit PD, for example a photodetector or photodiode.

Figure 3:
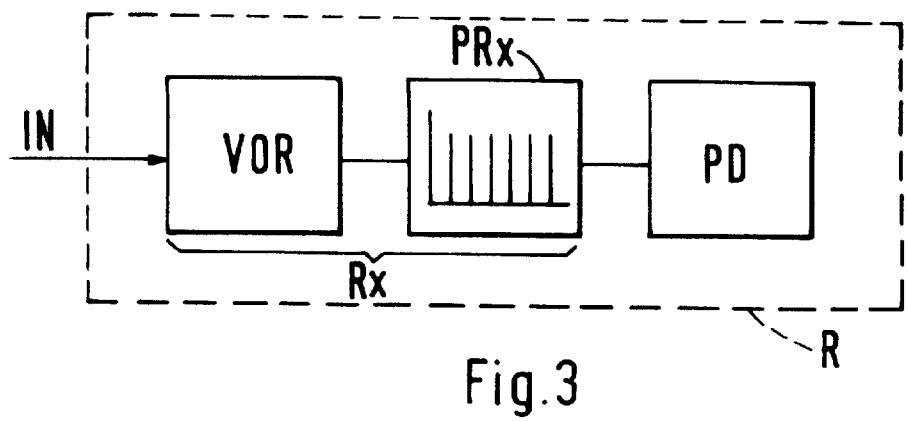
FIG. 3 shows an embodiment of a receiver according to the invention.

FIG. 3 shows one embodiment of a receiver R according to the invention. A prefilter VOR is connected to an optical input IN which is connectable to the communications network by an optical fiber. The output of the prefilter VOR is coupled to the periodic filter PRx. The prefilter VOR and the periodic filter PRx together form the filter device Rx of the receiver R. The periodic filter PRx is followed by the optical detector unit PD, which converts the output signal from the periodic filter PRx into an electric signal.

The prefilter has a transfer function by which the optical frequency spectrum of the signal is changed in such a way that its cosine transform is limited to a predetermined range of a tuning curve. The transfer function of a filter is an expression which relates the output of the filter to its input as a function of the frequency f of the input signal. The tuning curve is the curve according to which the total received power of the signal decreases as the periodic receiver filter PRx is detuned relative to the transmitter filter Tx (nominal transfer function).

The received optical power in the receiver is $$P_{Rx} = \int_0^\infty S(f) \cdot T_{Tx}(f) \cdot T_{Rx}(f) \cdot df \qquad (1)$$

where $T_{Tx}(f)$ is the transfer function of the transmitter filter, $T_{Rx}(f)$ is the transfer function of the receiver filter, and $S(f)$ is the spectral power density of the signal light source in the transmitter.

For a Mach-Zehnder interferometer, the filter transfer function T(f) is given by T(f) 1+cos(2πfτ) (2)

If other types of filters are used for the transmitter filter, for example a Fabry-Perot interferometer, a Michelson interferometer, a Lyot filter, or an arrayed waveguide grating, a similar relation holds true, as can be shown by expansion as a Fourier series. Depending on the type of filter used, higher terms occur in τ, which cause small deviations from the tuning curve described in the following.

τ denotes the roundtrip time of the filter and is the reciprocal of the free spectral range (FSR). It represents a characteristic of the filter and is the transit-time difference of two interfering lightwaves having passed through the filter by different paths. In the case of the Mach-Zehnder interferometer, the roundtrip time is the transit-time difference of a lightwave between the two interferometer arms. In the case of the Fabry-Perot interferometer, the roundtrip time is the difference in path length between the two mirror surfaces of the interferometer, i.e., the difference between the transit times of a lightwave reflected back and fourth once between the mirror surfaces and a directly transmitted lightwave.

From Relations (1) and (2) it follows that the tuning curve, i.e., the curve according to which the total received power of the information signal increases or decreases as a function of the roundtrip time τ, is the cosine transform of the spectral distribution of the signal light source except for a constant offset (the constant offset has been deducted):

$$P_{Rx}(\tau) = \int_0^\infty S(f) \cdot T_{Tx}(f) \cdot \cos(2\pi f \tau) df \qquad (3)$$

Figure 4:
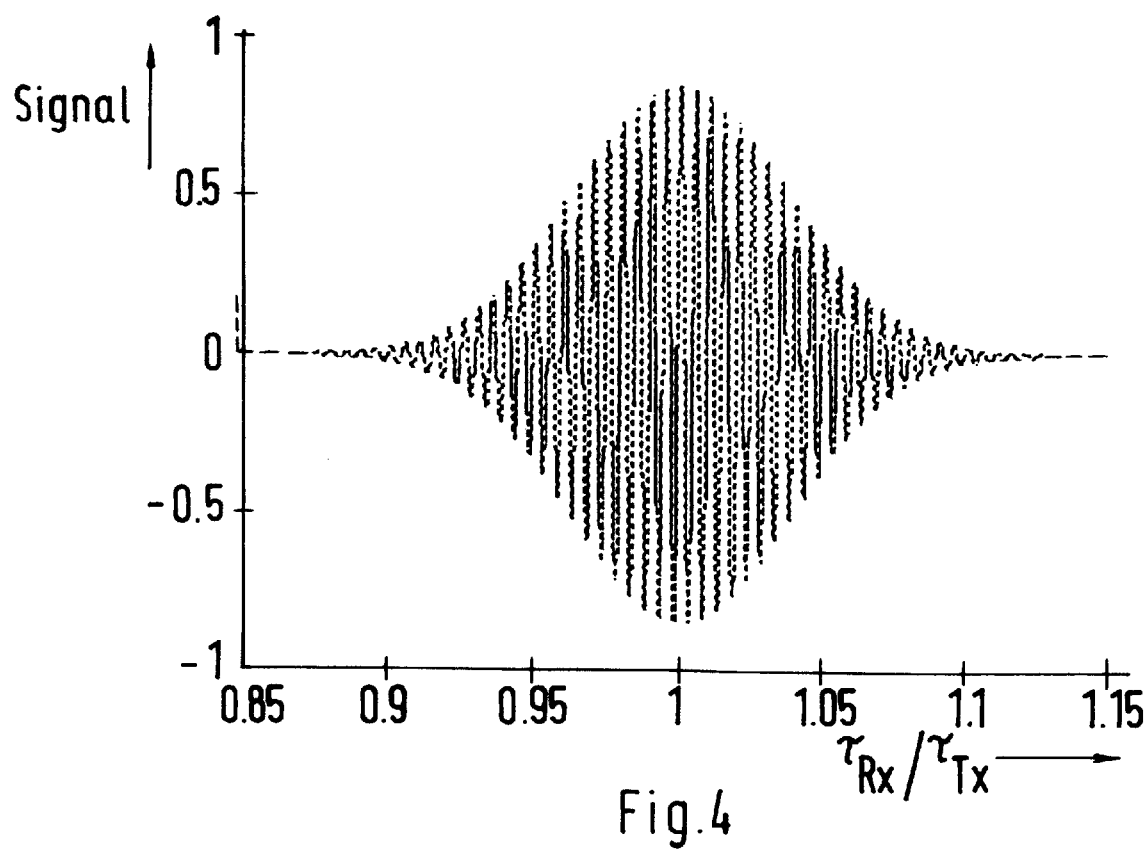
FIG. 4 is a tuning curve showing the received power when tuning the receiver filter in the absence of a prefilter.

For a Gaussian spectral distribution of the signal light source, the tuning curve without the use of a prefilter VOR is shown in FIG. 4. The abscissa represents the tuning range, i.e., the detuning of the periodic receiver filter relative to the transmitter filter, expressed as a quotient of the filter roundtrip times $\tau_{Rx}/\tau_{Tx}$. The ordinate represents the received power normalized to the total power of the light source, with the constant offset having already been deducted. The tuning curve has distinct, sharp maxima and minima, while the envelope of the tuning curve tends to zero only slowly. From Relation (3) it follows that the envelope for a Gaussian spectral distribution is also a Gaussian curve.

Figure 5:
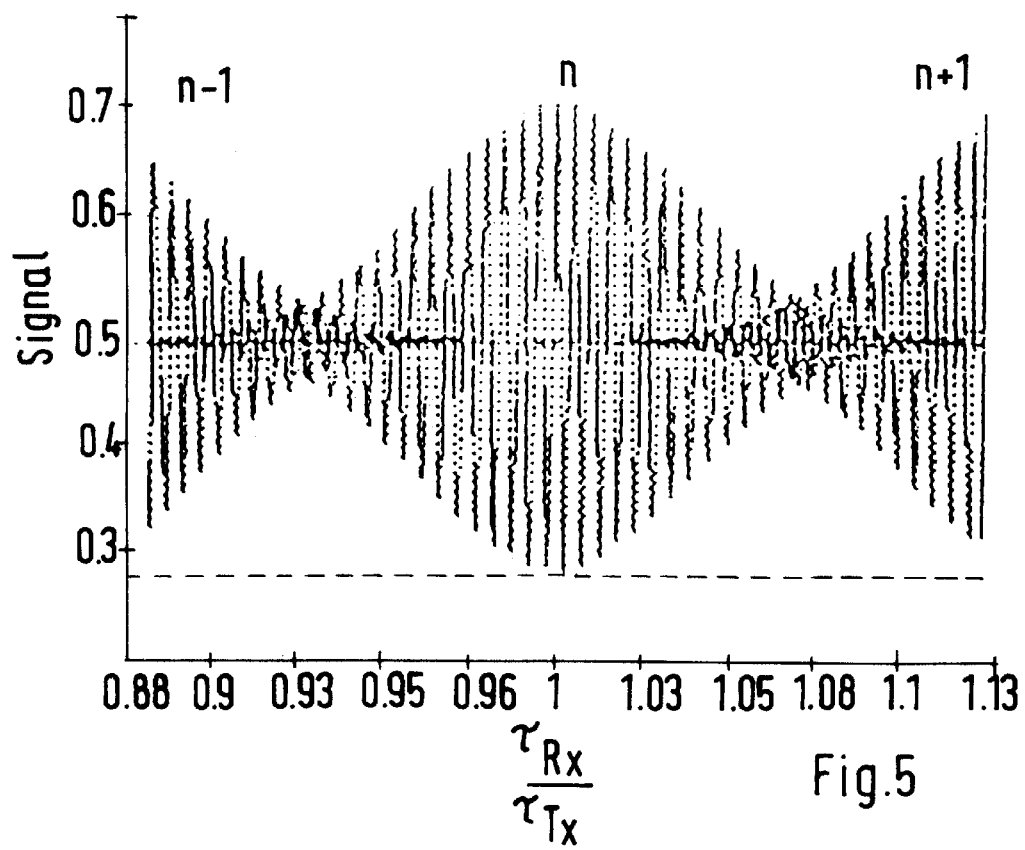
FIG. 5 is a tuning curve showing the received power when tuning the receiver filter in the absence of a prefilter, with two or more transmitters transmitting.

When two or more transmitters whose transfer functions are contiguous to each other in the tuning range are transmitting simultaneously, their tuning curves overlap and crosstalk results. This is illustrated in FIG. 5. Here, three transmitters are transmitting on channels n−1, n, and n+1, so that the tuning curves for the three channels overlap.

Figure 6:
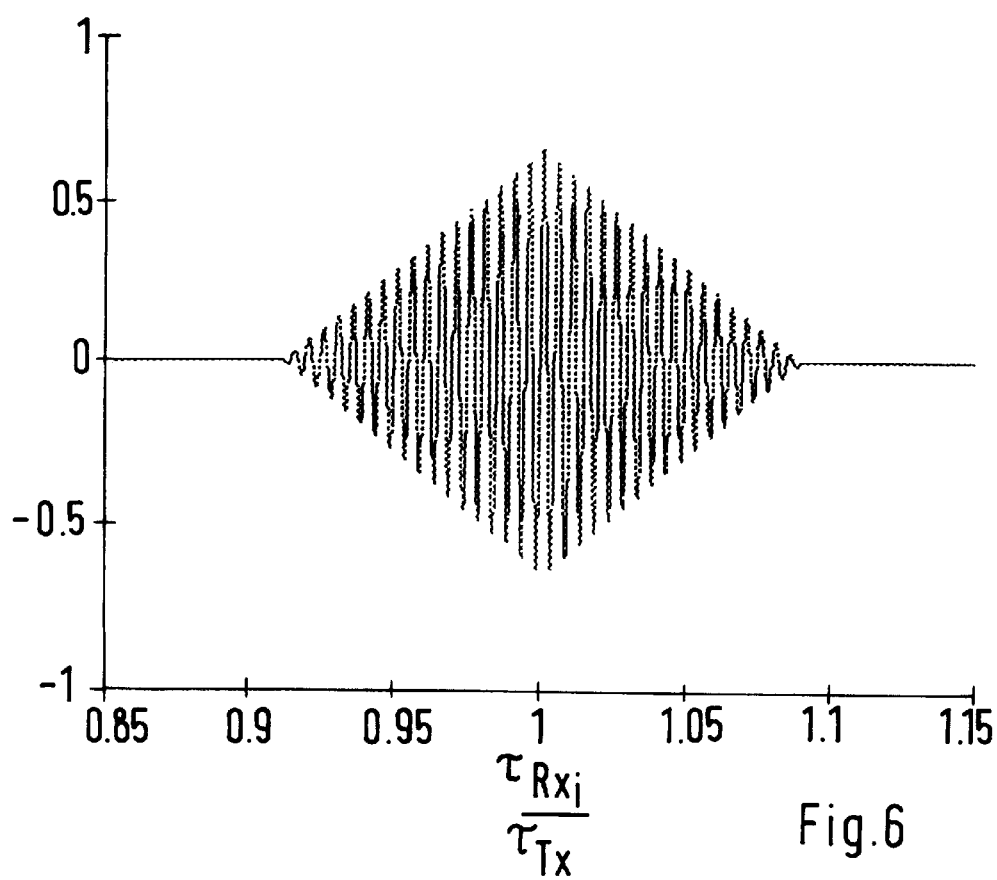
FIG. 6 is a tuning curve showing the received power when tuning the receiver filter in the presence of a prefilter.

Using the prefilter, this overlapping of the tuning curves is avoided by limiting the cosine transform of the spectral distribution to a predetermined subrange of the tuning range. In the embodiment, this is accomplished by using a prefilter with a transfer function which is proportional to $(\sin(f)/f)^2$. The cosine transform of such a function is a triangular function. Therefore, the envelope of the tuning curve is a triangular function. The tuning curve of the arrangement of the first embodiment is shown in FIG. 6. It can be clearly seen that the tuning curve is limited to a narrow subrange of the tuning range of $0.91 < \tau_{Rx}/\tau_{Tx} < 1.09$.

Figure 7:
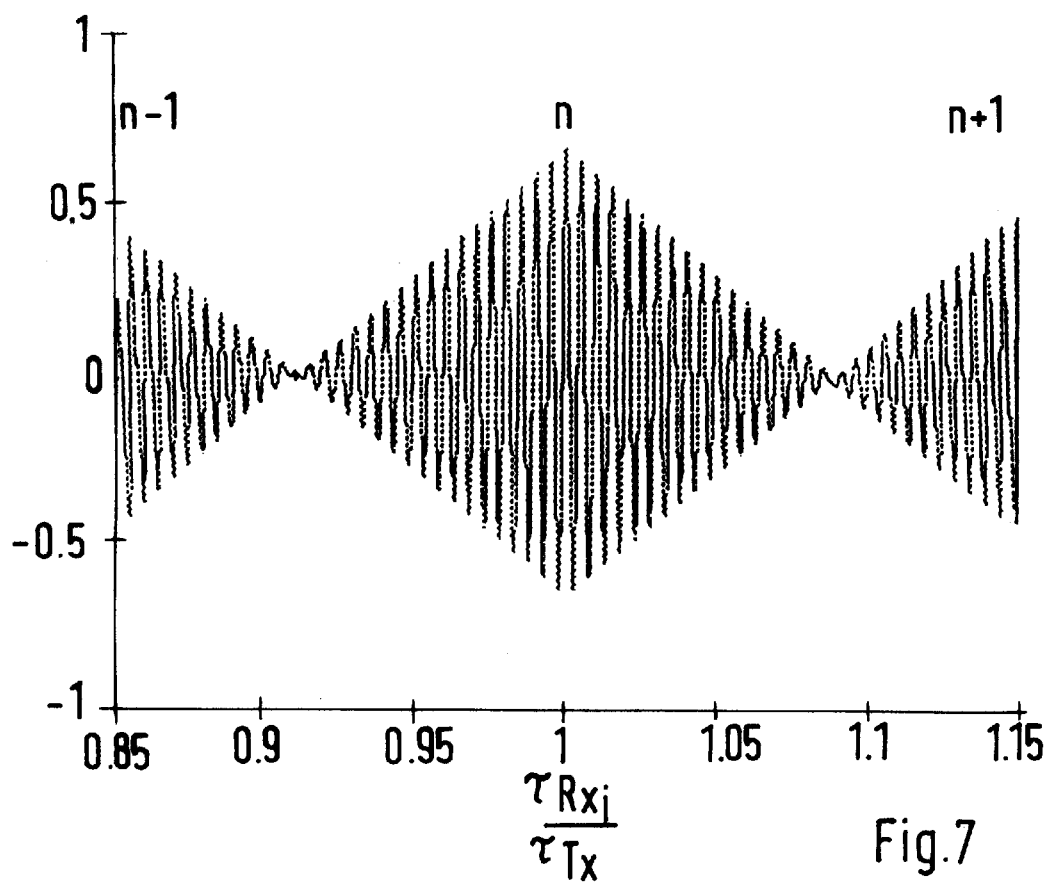
FIG. 7 is a tuning curve showing the received power when tuning the receiver filter in the presence of a prefilter, with two or more transmitters transmitting.

FIG. 7 shows, in addition to the tuning curve of FIG. 6, the tuning curves for the adjacent channels n−1 and n+1. It is readily apparent that the three tuning curves do not overlap. Thus, crosstalk is avoided even if transmitter and receiver filters are detuned relative to each other.

Figure 8:
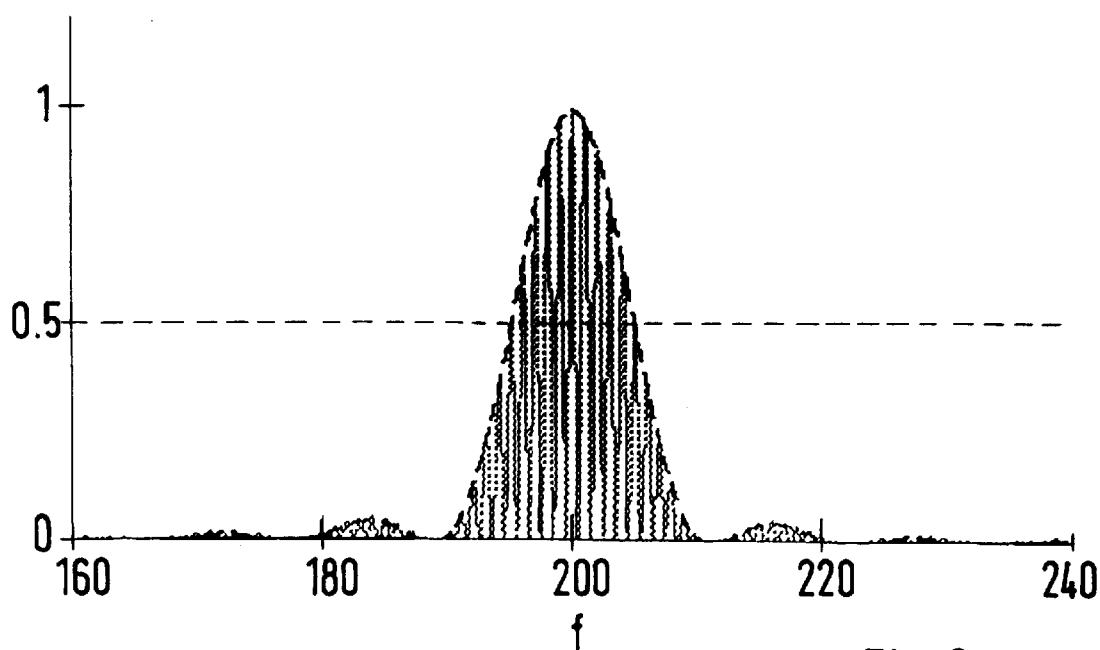
FIG. 8 shows the transfer function of a prefilter.

In the embodiment, a triangular envelope of the tuning curve is achieved by filtering the received signal in the receiver with the prefilter. For a constant frequency distribution, the prefilter has a transfer function proportional to $(\sin(f)/f)^2$. This prefilter transfer function is shown in FIG. 8. The abscissa represents the spectral frequency range of the received signal in THz, and the ordinate represents the filter transmission, i.e., the portion of an incident light signal which is transmitted through the filter. Plotted below this transmission curve is the transfer function of the periodic filter, which is implemented with equidistant bandpass filters.

It is also possible to use prefilters which change the received signal in such a way that the envelope of the cosine transform is a different function limited to a particular subrange of the tuning range, e.g., a rectangular or trapezoidal function. However, attention should be paid to the fact that the effect of the prefilter depends on the spectral distribution of the received signal. In the embodiment, this spectral distribution has a Gaussian shape, since an at least approximately Gaussian distribution is a frequently occurring signal waveform. Also, the spectral distribution of the received signal need not necessarily be identical with the spectral distribution of the transmitter's signal light source, since the distribution can be changed in the communications network by optical amplifiers, regenerative repeaters and other components of the network.

In a particularly preferred embodiment, the prefilter and the periodic filter are combined into a single filter. This can be achieved by means of a Fabry-Perot interferometer, for example. Such an interferometer may consist of optically flat and parallel glass plates which are made partly reflecting by means of a specific coating, such as an evaporated dielectric coating. By appropriate choice of the thickness, density, and material of the coating, frequency- or wavelength-dependent reflection can be achieved, such that the frequency-dependent prefilter transfer function is realized by the frequency-dependent reflection. Other possibilities of combining the filters into a single filter follow from the methods of integrated optics based on silicon/silica, lithium niobate, or indium phosphide, by which a Mach-Zehnder interferometer can be implemented, for example. A single filter is easier to position in the beam path, can be made at lower cost, and takes up less space.

The filter device according to the invention for use in the optical communications network consists of the prefilter and the periodic filter. Besides being suitable for use in the receiver, it can also be used in the transmitters. Then it serves not to decode received signals, but to encode and prefilter signals to be transmitted. This use is advantageous if the communications system has few transmitters, but a great number of receivers, and if the communications network does not or only slightly affect and change the spectral distribution of the transmitted signals. An exemplary application is in a distribution network for broadband video or televisision services, e.g., video-on-demand (VoD) or digital video broadcasting (DVB). In such a network, no prefilters are needed in the receivers, so that the receivers can be made at lower cost.

A transmission method according to the invention involves coding the modulated light signals, which are generated e.g. by means of a directly modulated, broadband light source, with a periodic transmitter filter, transmitting the coded light signals through a communications network, and decoding them and converting them into electric signals in the receiver by means of the periodic filter and the detector unit, respectively. Prior to the conversion, preferably prior to the decoding, the received signal is filtered by means of the prefilter, which has a transfer function as described above.

This transmission method has a special advantage in that a crosstalk improvement is achieved without any changes in the transmitters. Another advantage is that a narrower channel assignment can be permitted in the tuning range. This results in an increase in the maximum possible number of transmitters, and thus the number of subscribers, in the network.

What is claimed is:

1. A receiver (R) for an optical communications system for transmitting coded optical signals, comprising an optical detector unit (PD) and an optical filter device (Rx) connected ahead of said optical detector unit (PD) and comprising a periodic filter (PRx) with a periodic transfer function, characterized in that the filter device (Rx) additionally comprises a prefilter (VOR) with a transfer function by which the optical frequency spectrum of the signal can be changed in such a way that its cosine transform is limited to a predeterminable range of a tuning curve showing the total received power when tuning the periodic filter (PRx).

2. A receiver (R) as claimed in claim 1 wherein the periodic filter (PRx) and the prefilter (VOR) are combined into a single filter (Rx).

3. A receiver (R) as claimed in claim 1 wherein the prefilter (VOR) has a transfer function T(f) proportional to $(\sin(f)/f)^2$, where f is the optical frequency.

4. A receiver (R) as claimed in claim 1 wherein the optical frequency spectrum of the signal is changed by the prefilter transfer function in such a way that the envelope of the cosine transform is a rectangular or trapezoidal function.

5. A receiver (R) as claimed in claim 2 wherein the single filter (Rx) is a Fabry-Perot interferometer in which the prefilter transfer function is implemented with a frequency-dependent, partially reflecting coating.

6. An optical filter device (Rx) for use in an optical communications system for transmitting coded optical signals, comprising a periodic filter (PRx) with a periodic transfer function, characterized by an additional prefilter (VOR) having a transfer function by which the optical frequency spectrum of the signal can be changed in such a way that its cosine transform is limited to a predeterminable range of a tuning curve showing the total received power when tuning the periodic filter (PRx).

7. A method of transmitting coded optical signals in an optical communications system, comprising the steps of coding the signal in a transmitter (T) by means of a transmitter filter and decoding it and converting it to an electric signal in a receiver (R) by means of a periodic filter (PRx) and a detector unit (PD), respectively, characterized in that prior to the conversion, the signal is filtered by means of a prefilter (VOR) with a transfer function which changes the optical frequency spectrum of the signal in such a way that its cosine transform is limited to a predeterminable range of a tuning curve showing the total received power when tuning the periodic filter (PRx).

* * * * *